July 7, 1942.  L. H. SEIDEL  2,289,216

FISHING ROD HANDLE

Filed Oct. 17, 1940

INVENTOR.
Louis H. Seidel

BY
Frank M. Slough
HIS ATTORNEY

Patented July 7, 1942

2,289,216

UNITED STATES PATENT OFFICE 2,289,216

FISHING ROD HANDLE

Louis H. Seidel, Geneva, Ohio, assignor to The American Fork & Hoe Company, Cleveland, Ohio, a corporation of Ohio Application October 17, 1940, Serial No. 361,529

5 Claims. (Cl. 43—22)

This invention relates to fishing rod handles and relates more particularly to an improved and novel means for detachably mounting a reel thereon.

Prior fishing rod handles of this type with which I am familiar have either disposed the means for operating the reel clamping parts rearwardly of the hand grip portion of the handle or have provided means which were difficult to manipulate and which are closely adjacent the reel seat. I am familiar with patent to John S. Burdick, No. 1,994,449, and to Walter E. Moulton, No. 2,182,901, wherein manually operable means are mounted at the rear of the handle. I am further familiar with patents to Robert McKechnie, No. 2,057,535, and J. Karl Kinnear, No. 2,102,237, wherein various other type mounting means are employed.

It is an object of my invention to provide improved reel seating means for fishing rod handles which possess improved features over the structures shown in the above named patents.

Another object of my invention is to provide an improved fishing rod handle adapted to accommodate reels of varying sizes and having improved qualities of strength and rigidity.

Another object of my invention is to provide improved means for securing a conventional type reel to the reel seat of a fishing rod handle which will be simple in construction, easily operated and effective in use.

Another object of my invention is to provide improved means for securing a reel of the conventional type to the reel seat of a fishing rod handle where few parts are employed.

Other objects of my invention and the invention itself will become increasingly apparent from a consideration of the following description and drawing wherein.

Figure 2:
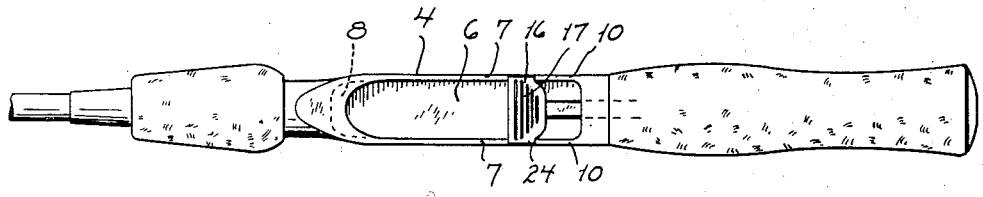
Fig. 2 is a top plan view of the handle of Fig. 1.
Figure 1:
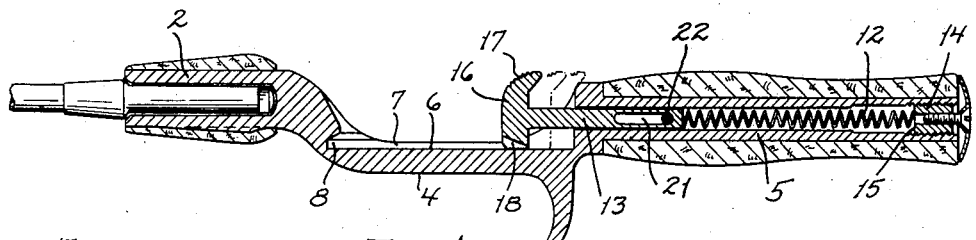
Fig. 1 is a longitudinal medial section of a fishing rod handle embodying my invention, illustrating in dotted lines several operative positions which the clamp means of my invention will take.
Figure 3:
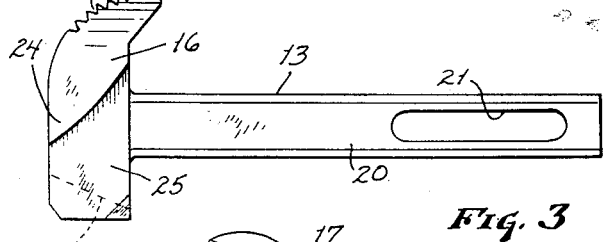
Fig. 3 is an elevational view of a part of the reel lock of my invention.
Figure 5:
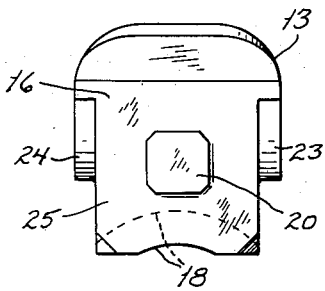
Fig. 5 is a rear elevational view of the plunger of Fig. 3.
Figure 4:
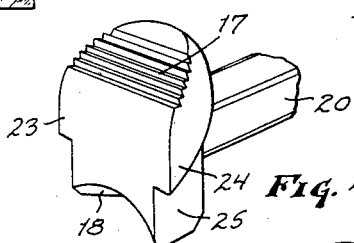
Fig. 4 is a perspective view of the enlarged head of the plunger of Fig. 3.

Referring now to the drawing, in all of which like parts are designed by like reference characters, I show a fishing rod handle, preferably formed of light metal such as aluminum, although the same may be formed from any desired metal, including a tubular rod, receiving portion 2, an intermediate reel seat portion 4 and a hand grip portion 5. The hand grip portion 5 and the rod receiving portion 2 are preferably encased in cork or the like.

The reel seat portion 4 of the handle comprises a depressed portion 6 upon which the reel base rests, said depressed portion having upstanding flanges 7 limiting transverse movement of the reel base and an undercut forming a pocket 8 at the forward end of said depressed portion, said pocket adapted to receive the toe 9 of the reel base. The flanges 7 and 8 merge rearwardly with upstanding flanges 10.

The hand grip portion 5 of the handle is centrally bored for the reception of a compression spring 12 and a plunger 13. A plug element 14 threadedly engages the bore and forms an abutment at 15 for the spring end convolutions; the plunger element 13 includes an enlarged head 16 having an upper thumb engaging serrated portion 17 and is provided with an arcuate surface 18 on its bottom surface into which the reel base heel 19 is adapted to project. The plunger element 13 is further provided with a stem 20 preferably having a square shank which gives additional strength as well as alignment to the plunger head 16.

Figure 6:
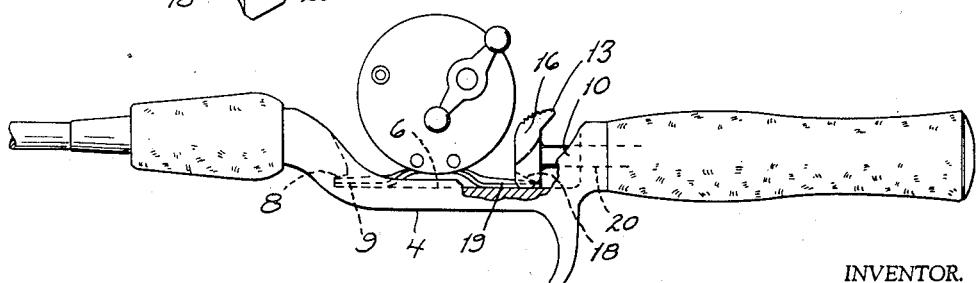
Fig. 6 is an elevational view of a fishing rod handle embodying my invention and showing a reel affixed thereto.

It is to be noted that the stem or shank portion 20 is provided with a slotted portion 21 adjacent its inner terminus and into which bearing or pin means 22 is adapted to project. It is further to be noted that the enlarged head 16 is provided with a pair of ears 23 and 24 which extend outwardly from its arcuately cut lower reel base heel engaging portion 25. The reel base end portions, as illustrated in Fig. 6, are seated by projecting the reel base toe 9 within the pocket 8 of the reel seat and forcing the plunger 13 rearwardly against the compression of the spring 12 to permit the reel base heel 19 to engage the reel seat and upon release of the plunger element 13, the spring will force the plunger element 13 forwardly to tightly wedge the reel base toe within the pocket 8 and force the arcuately formed reel base heel engaging portion 25 of the enlarged head 16 of the plunger element to ride upon the upwardly concave heel portion 19 of the reel base.

It will be noted that the serrated portion of the enlarged head keeps the thumb from slipping off the head when the plunger is pulled back by means of the thumb to insert the reel.

Although I have shown and described a preferred embodiment of my invention, I am aware that numerous and extensive departures may be made therefrom without departing from the spirit of my invention and the scope of the appended claims.

I claim:

1. In a fishing rod handle, a hand grip portion, a reel seat base, a plunger element comprising an enlarged head portion and a hand grip engaging portion, said hand grip engaging portion being projected into said hand grip portion of the handle, said hand grip portion having bearing means associated therewith which are projected through a slot provided in said hand grip engaging portion of the plunger, resilient means disposed within said hand grip portion adapted to continuously urge the plunger means in a forward direction whereby upon the exercise of manual pressure upon said enlarged head portion drawing the same in a rearward direction rearward compression of the resilient means is effected whereby said plunger element is projected rearwardly within said hand grip portion.

2. In a fishing rod handle, a hand grip portion, a reel seat base, a plunger element comprising an enlarged head portion and a hand grip engaging portion, said hand grip engaging portion being projected into said hand grip portion of the handle, said hand grip portion having bearing means associated therewith which are projected through a slot provided in said hand grip engaging portion of the plunger, resilient means disposed within said hand grip portion adapted to continuously urge the plunger means in a forward direction whereby upon the exercise of manual pressure upon said enlarged head portion drawing the same in a rearward direction rearward compression of the resilient means is effected whereby said plunger element is projected rearwardly within said hand grip portion, release of said manual pressure causing wedging engagement between said plunger and a reel seated upon said reel seat base.

3. In a fishing rod handle, a hand grip portion, a reel seat base, a plunger element comprising an enlarged head portion and a hand grip engaging portion, said hand grip engaging portion being projected into said hand grip portion of the handle, said hand grip portion having bearing means associated therewith which are projected through a slot provided in said hand grip engaging portion of the plunger, resilient means disposed within said hand grip portion adapted to continuously urge the plunger means in a forward direction whereby upon the exercise of manual pressure upon a serrated upper portion of said enlarged head portion drawing the same in a rearward direction rearward compression of the resilient means is effected whereby said plunger element is projected rearwardly within said hand grip portion.

4. In a fishing rod handle, a hand grip portion, a reel seat base, said hand grip portion being centrally bored, a plunger element adapted to be projected into said centrally bored hand grip portion, said plunger element having an enlarged head portion and a hand grip engaging stem portion, said stem portion having bearing means projected therethrough and associated with said hand grip portion, resilient means disposed within the central bore of said hand grip portion and adapted to be seated therein and to continuously urge said plunger element forwardly of the hand grip portion, said enlarged head portion of the plunger having an upper outwardly extending serrated portion and a lower inclined surface whereby upon the exercise of manual pressure on said serrated portion of the plunger in a rearward direction said enlarged head portion is withdrawn to the rearmost portion of the reel seat base and upon release of said pressure the enlarged head portion is urged forwardly by said resilient means, and said inclined surface of said enlarged head portion is adapted to have wedging engagement with a portion of a reel seated in said reel base.

5. In a fishing rod handle, a hand grip portion, a reel seat base, said hand grip portion being centrally bored, a plunger element adapted to be projected into said centrally bored hand grip portion, said plunger element having an enlarged head portion and a hand grip engaging stem portion, said stem portion having bearing means projected through a slot extending lengthwise of said stem portion and associated with said hand grip portion, resilient means disposed within the central bore of said hand grip portion and adapted to be seated therein and to continuously urge said plunger element forwardly of the hand grip portion, said enlarged head portion of the plunger having an upper outwardly extending serrated portion and a lower inclined surface whereby upon the exercise of manual pressure on said serrated portion of the plunger in a rearward direction said enlarged head portion is withdrawn to the rearmost portion of the reel seat base and upon release of said pressure the enlarged head portion is urged forwardly by said resilient means, said bearing means being adapted to ride forwardly in said slot and said inclined surface of said enlarged head portion adapted to have wedging engagement with a portion of a reel seated in said reel base.

LOUIS H. SEIDEL.